(No Model.)
R. H. LANYON.
BRAKE BLOCK.
No. 399,055. Patented Mar. 5, 1889.
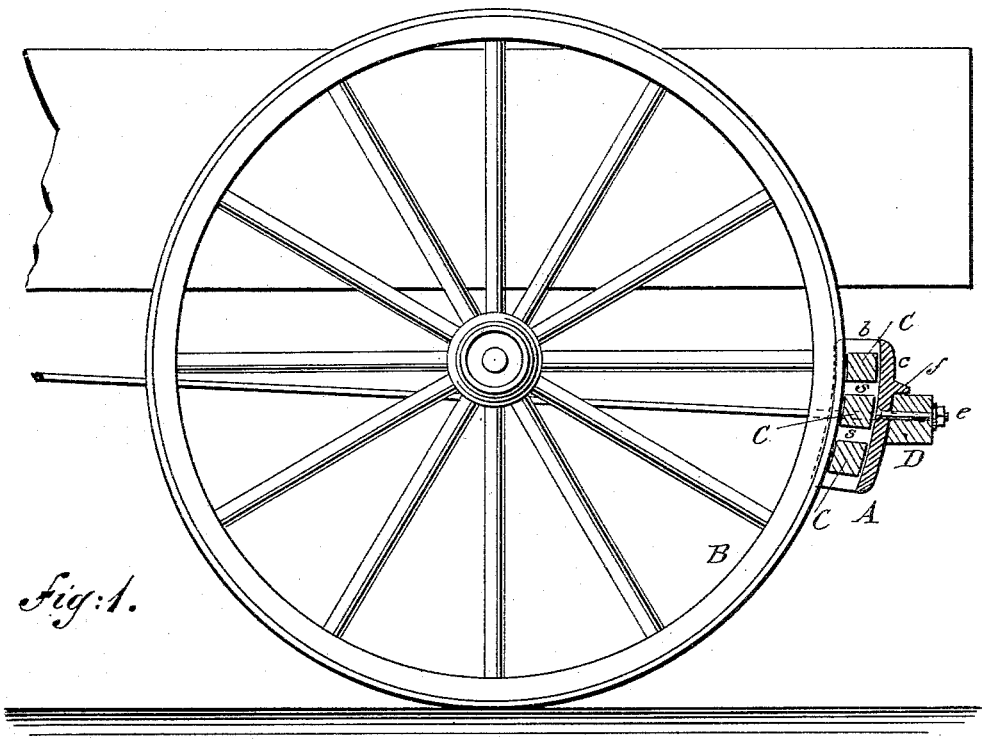
Fig: 1.
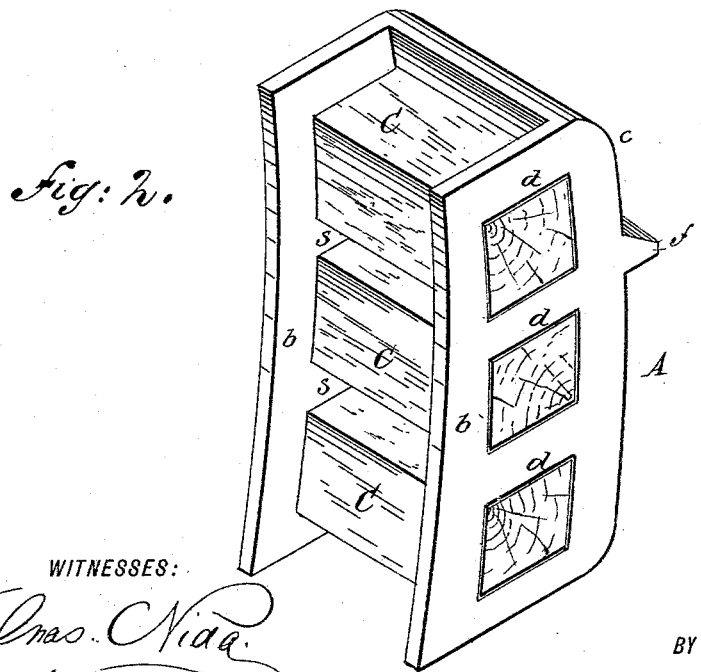
Fig: 2.
WITNESSES:
Chas. C. Nida.
C. Sedgwick.
INVENTOR:
R. H. Lanyon
BY Munn & Co.
ATTORNEYS.

UNITED STATES PATENT OFFICE.

ROBERT H. LANYON, OF CARTERVILLE, MISSOURI, ASSIGNOR OF ONE-HALF TO WILLIAM E. POUNDSTONE, OF SAME PLACE.

BRAKE-BLOCK.

SPECIFICATION forming part of Letters Patent No. 399,055, dated March 5, 1889.

Application filed November 17, 1888. Serial No. 291,099. (No model.)

*To all whom it may concern:*

Be it known that I, ROBERT H. LANYON, of Carterville, in the county of Jasper and State of Missouri, have invented a new and useful Improvement in Brake-Blocks, of which the following is a full, clear, and exact description.

This invention relates to brake-blocks for wagons and other wheel-vehicles; and it consists in a novel construction of the block, which combines separated wooden rubbing or bearing blocks with a metal frame for carrying the same, substantially as hereinafter described, and pointed out in the claims.

Reference is to be had to the accompanying drawings, forming a part of this specification, in which similar letters of reference indicate corresponding parts in both figures.

Figure 1 represents a side elevation of a wagon in part, with my improved brake-block and the brake-beam which carries it in section applied. Fig. 2 is a view in perspective of the brake-block detached.

A is a metal frame, which for large wagons may be made of malleable cast-iron, and for small wagons of sheet-iron, or it may be made of any suitable metal. Said frame A is of sufficient width to receive the tire portion of the wheel B of the wagon within it for any desired length of the periphery of the wheel, and is curved to conform to the wheel. It is made with sides $b\ b$ and a back, $c$. Each of the sides has a series of rectangular or other suitably-shaped openings, $d$, in it, adapted to receive a series of separated wooden blocks, C C, which form the rubbing or bearing surfaces of the brake-block on the wheel, said wooden blocks being separated from each other in a transverse direction relatively to the frame. The back $c$ of the frame has a slot in it for a bolt, $e$, by which the brake-block may be attached to the usual brake-beam, D, and said back is furthermore provided with a lug, $f$, arranged to rest on top of the beam, and serving to keep the brake-block from turning upon the bolt. The brake-block, however, may be otherwise attached to the beam.

The wooden blocks C C can be readily applied to the frame by entering them through the apertures $d$ in the latter, and can be as readily replaced when worn, and will be securely held in place by the walls of said apertures, and also may be supported by the back $c$ of the frame. The whole brake-block, too, which may be got up at but little expense, can be readily applied to any brake-beam, and will be found much more durable than ordinary brake-blocks. The spaces $s$ between the separated wooden blocks C C serve to catch mud or grit from the wheel, and thus cause said blocks, when the brake is applied, to hold better onto the wheel, also largely contributing to the durability of the wooden blocks.

Having thus described my invention, what I claim as new, and desire to secure by Letters Patent, is—

1. In a brake-block for wagons and other vehicles, the metal frame A, having a back, $c$, and constructed with sides $b\ b$, adapted to receive the tire of the vehicle-wheel within them, and provided with openings $d\ d$, essentially as and for the purpose herein set forth.

2. In a brake-block for wagons and other vehicles, the metal frame A, having apertured sides $b\ b$ and a back, $c$, provided with a bolt-hole and an exterior lug, $f$, essentially as described.

3. In a brake-block for wagons and other vehicles, the combination of the frame A, having a back, $c$, and constructed with sides $b\ b$, having a series of openings, $d$, in them, and the separated wooden blocks C C, arranged to enter within said openings and leaving spaces $s$ in between them, substantially as shown and described.

ROBERT H. LANYON.

Witnesses:
O. G. BYERS,
BYRON D. MOWRY.